(12) United States Patent
Darnell et al.

(10) Patent No.: US 10,513,996 B2
(45) Date of Patent: Dec. 24, 2019

(54) VERIFICATION MODULE FOR VERIFYING ACCURACY OF A CONTROLLER

(71) Applicant: JAGUAR LAND ROVER LIMITED, Warwickshire (GB)

(72) Inventors: Paul Darnell, Coventry (GB); John Birch, Coventry (GB); Ravindra Sabbella, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 2 days.

(21) Appl. No.: 15/756,718

(22) PCT Filed: Aug. 11, 2016

(86) PCT No.: PCT/EP2016/069145
§ 371 (c)(1),
(2) Date: Mar. 1, 2018

(87) PCT Pub. No.: WO2017/041983
PCT Pub. Date: Mar. 16, 2017

(65) Prior Publication Data
US 2018/0274466 A1    Sep. 27, 2018

(30) Foreign Application Priority Data

Sep. 7, 2015  (GB) .................................. 1515837.1

(51) Int. Cl.
*F02D 41/14*   (2006.01)
*F02D 41/26*   (2006.01)
*G05B 23/02*   (2006.01)

(52) U.S. Cl.
CPC ......... *F02D 41/1401* (2013.01); *F02D 41/26* (2013.01); *G05B 23/0256* (2013.01);
(Continued)

(58) Field of Classification Search
CPC .... F02D 41/1401; F02D 41/26; F02D 11/107; F02D 2200/703; F02D 2200/0414;
(Continued)

(56) References Cited

U.S. PATENT DOCUMENTS 5,287,233 A * 2/1994 Lee ...................... G11B 15/026
                                                          360/71
5,539,638 A    7/1996 Keeler et al.
(Continued)

FOREIGN PATENT DOCUMENTS

DE          10137597 A1    3/2002
DE       102006011807 A1    9/2007
(Continued)

OTHER PUBLICATIONS

International Search Report and Written Opinion of the International Searching Authority for International application No. PCT/EP2016/069145 dated Dec. 1, 2016.
(Continued)

*Primary Examiner* — Joseph J Dallo
(74) *Attorney, Agent, or Firm* — Carlson, Gaskey & Olds

(57) ABSTRACT

The invention relates to a verification module (118) for verifying accuracy of a controller (116). The controller (116) is arranged to generate a demand based on a first input and a second input. The verification module (118) comprises; a calculation module (120) arranged to calculate an expected demand; a correction module (122) arranged to calculate an error between the demand and the expected demand and modify the expected demand to reduce the error; and a limiter (136) arranged to limit the demand in response to the error being greater than a threshold.

13 Claims, 4 Drawing Sheets

(52) U.S. Cl.
CPC ........... *F02D 2200/0414* (2013.01); *F02D 2200/1002* (2013.01); *F02D 2200/602* (2013.01); *F02D 2200/604* (2013.01); *F02D 2200/702* (2013.01); *F02D 2200/703* (2013.01)

(58) Field of Classification Search
CPC ....... F02D 2200/1002; F02D 2200/702; F02D 2200/606; F02D 2200/604; F02D 2200/602; F02D 2011/102; G05B 23/0256; G05B 23/0243
See application file for complete search history.

(56) References Cited

U.S. PATENT DOCUMENTS

| | | | | |
|---|---|---|---|---|
| 6,307,336 | B1* | 10/2001 | Goff | H02P 6/085 |
| | | | | 318/400.09 |
| 6,366,043 | B1* | 4/2002 | Stancu | B60L 50/50 |
| | | | | 318/432 |
| 7,256,563 | B2* | 8/2007 | Kuehner | H02P 21/22 |
| | | | | 318/432 |
| 2002/0079170 | A1* | 6/2002 | Lee | B60T 13/74 |
| | | | | 188/1.11 E |
| 2003/0120413 | A1* | 6/2003 | Park | B60T 8/1703 |
| | | | | 701/71 |
| 2003/0130783 | A1* | 7/2003 | Hellmann | B60K 31/0008 |
| | | | | 701/93 |
| 2004/0011575 | A1 | 1/2004 | Matischok et al. | |
| 2004/0204813 | A1 | 10/2004 | Doering | |
| 2008/0268964 | A1* | 10/2008 | Kim | F16D 7/022 |
| | | | | 464/47 |
| 2014/0343817 | A1 | 11/2014 | Moellmann | |

FOREIGN PATENT DOCUMENTS

| | | |
|---|---|---|
| EP | 2055575 A2 | 5/2009 |
| EP | 2055595 A2 | 5/2009 |

OTHER PUBLICATIONS

Combined Search and Examination Report under Sections 17 and 18(3) for Application No. GB1515837.1 dated Mar. 8, 2016.

* cited by examiner

VERIFICATION MODULE FOR VERIFYING ACCURACY OF A CONTROLLER

TECHNICAL FIELD

The invention relates to a verification module for verifying accuracy of a controller and more particularly, but not exclusively, to a controller in a drive-by-wire system. Aspects of the invention relate to a verification module, a controller, a drive-by-wire system, a vehicle, and a method of verifying accuracy of a controller.

BACKGROUND

With reference to FIG. 1, a vehicle is driven by a drive system. The drive system includes an engine 8 for powering a set of wheels. Modern drive systems include a degree of computerised control. A drive system including computerised control may be termed a 'drive-by-wire' system due to there being no direct mechanical link between an accelerator pedal and the engine 8. Instead, the drive-by-wire system includes a computer operatively located between an accelerator pedal and the engine to control the engine based on the position of the accelerator pedal.

In-use, the driver of the vehicle controls the speed of the vehicle by changing the position of the accelerator pedal 12. The system may also include a drive mode selector 14 in the form of a hand operated lever, or the like. Different positions of the drive mode selector 14 correspond to different driving modes, which driving modes may include 'sport' and 'economy'.

The accelerator pedal 12 position and drive mode selector 14 position are monitored by a controller 16. Various transfer functions are provided in the controller 16, each transfer function corresponding to a different driving mode. The controller 16 changes between driving modes in response to the drive mode selector 14 changing position. Each transfer function generates a torque demand based on the accelerator pedal 12 position.

However, various controller errors can occur which will produce inaccurate torque demands. Such inaccuracies could lead to excessive or insufficient engine torque for a given accelerator pedal 12 position. In an attempt to minimise such inaccuracies, a verification module 18 can be provided to verify the accuracy of the torque demand generated by the controller 16.

A typical verification module 18 uses both the drive mode selector 14 position and the accelerator pedal 12 position as inputs. The verification module 18 also monitors the actual torque demand generated by the controller 16. An expected torque demand 20 is generated by the verification module 18 independently of the actual torque demand 22 generated by the controller 16. In this way, the verification module 18 can compare the expected 20 and actual 22 torque demands and calculate an error 24. The error 24 can be used to limit 26 the torque demand in response to an error 24 being unsatisfactory. In this way, any errors in the actual torque demand will not cause unsatisfactory effects such as excessive torque being produced by the engine 8.

The verification module 18 must be of a higher level of integrity than the controller 16 so as to only detect real faults in the actual torque demand 22 and also be robust to false detection. In order to accommodate the increased level of integrity, the complexity of the verification module 18 is reduced compared to the controller 16, otherwise the vehicle would require an extremely expensive, complex, and highly powered computer to run. However, even a verification module 18 of reduced complexity is not ideal since developing it independently to the controller 16 would still require overly detailed knowledge of the actual controller design. In addition, any updates required to the controller 16 in service, for instance the modification of a particular transfer function associated with a drive mode, would require updates not only to the controller 16 but also to the verification module 18.

It is an object of the present invention to address at least some of the disadvantages associated with the prior art.

SUMMARY OF THE INVENTION

Aspects and embodiments of the invention provide a verification module, a controller, a drive-by-wire system, a vehicle, and a method of verifying accuracy of a controller as claimed in the appended claims.

According to an aspect of the present invention there is provided a verification module for verifying accuracy of a controller, the controller arranged to generate a demand based on a first input and a second input, said verification module comprising; a calculation module arranged to calculate an expected demand; a correction module arranged to calculate an error between the demand and the expected demand and to modify the expected demand to reduce the error; and a limiter arranged to limit the demand in response to the error being greater than a threshold.

Such a verification module operates independently to the second input of the controller since the expected demand is based only on the first input and modified based on the error between itself and the actual demand. In this way, updating the response of the controller to the second input would require no updates to the verification module. In addition, the verification module can be made much simpler since no detailed knowledge of the controller is required in terms of controller response to the second input.

The correction module may be arranged to reduce the error by applying an offset value to the expected demand. By applying the error offset, the verification module will adapt to the behavior of the controller without needing to be aware of what is causing the required adaptation.

The verification module may comprise a value constrainer for constraining the offset value to a maximum value.

The verification module may comprise a rate constrainer for constraining the offset value to a maximum rate of change.

In either case, the maximum value or the maximum rate of change should be large enough to accommodate a maximum change in the demand that the controller will generate for changes in the second input, when the controller is working correctly. In this way the verification module is robust to false detection of faults. Conversely, the maximum value and rate of change should be small enough that if a real controller fault did occur, the effect of the fault on the demand would not cause any adverse effects downstream.

The correction module may be arranged to determine a mean error based on a plurality of calculated errors and apply the offset to the mean error. In this way, any anomalies of errors would not impact as heavily on the actual demand value.

According to a further aspect of the present invention, there is provided a controller for a drive-by-wire system comprising the aforementioned verification module for verifying the accuracy of the controller, a terminal arranged to receive the first input and the second input, wherein the controller is arranged to generate the demand based on the first input and the second input.

The first input may be an accelerator pedal position. In this way, the verification module can operate solely based on the accelerator pedal position and independent from any other inputs.

The second input may be a drive mode selection for selecting between a plurality of driving modes. There may be several driving modes, including a sport mode and an economy mode. In this way, the behavior of the controller to the drive mode selected can be modified in service without having to change the operation of the verification module.

The demand may be a torque demand.

The demand may be an engine output torque demand.

The terminal may be arranged to receive one or more ancillary inputs, the ancillary inputs selected from a list including ambient air temperature, air pressure, surface gradient, and terrain type.

According to a further aspect of the present invention there is provided a drive-by-wire system for a vehicle comprising an accelerator pedal, a drive mode selector, an engine and the aforementioned controller for generating a torque demand based on the accelerator pedal position and the selected driving mode.

According to a further aspect of the present invention there is provided a vehicle comprising the aforementioned drive-by-wire system.

According to a further aspect of the present invention there is provided a method of verifying an accuracy of a controller, the method comprising;
  monitoring a first input to the controller;
  calculating an expected demand based on the first input;
  calculating an error between the expected demand and a demand generated by the controller, the demand based on the first input and a second input, and modifying the expected demand to reduce the error; and
  limiting the demand in response to the error being greater than a threshold.

According to a further aspect of the present invention there is provided a method of verifying an accuracy of a controller, the controller comprising a verification module, the verification module comprising a processor and operatively coupled storage device, the storage device comprising executable instructions which when executed by the processor configure the processor to:
  monitor a first input to the controller;
  calculate an expected demand based on the first input;
  calculate an error between the expected demand and a demand generated by the controller, the demand based on the first input and a second input to the controller, and modifying the expected demand to reduce the error; and
  limit the demand in response to the error being greater than a threshold.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
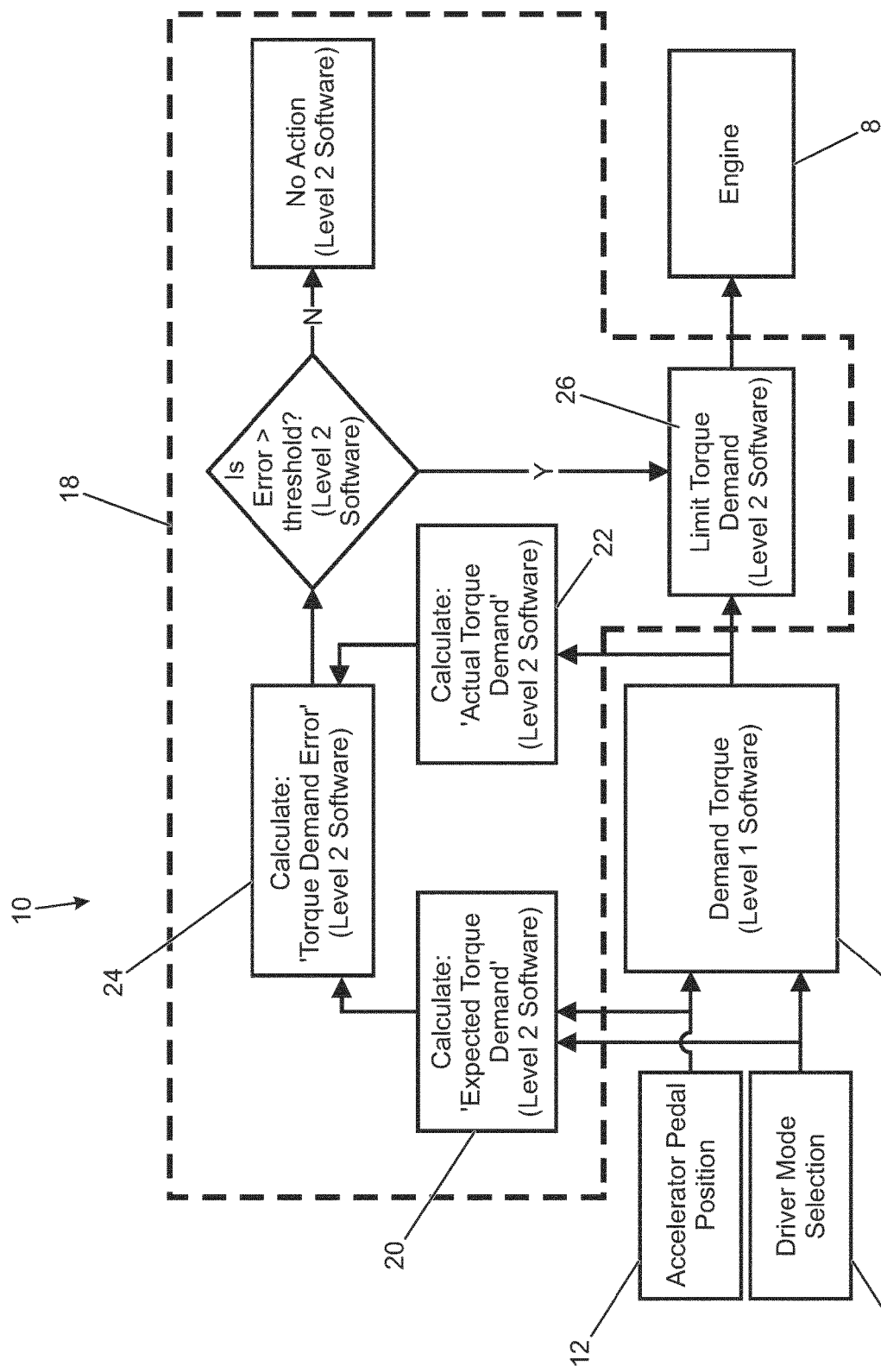
FIG. 1 shows a block diagram of a drive by wire system as known from the prior art, and which has already been described in the background section.
Figure 2:
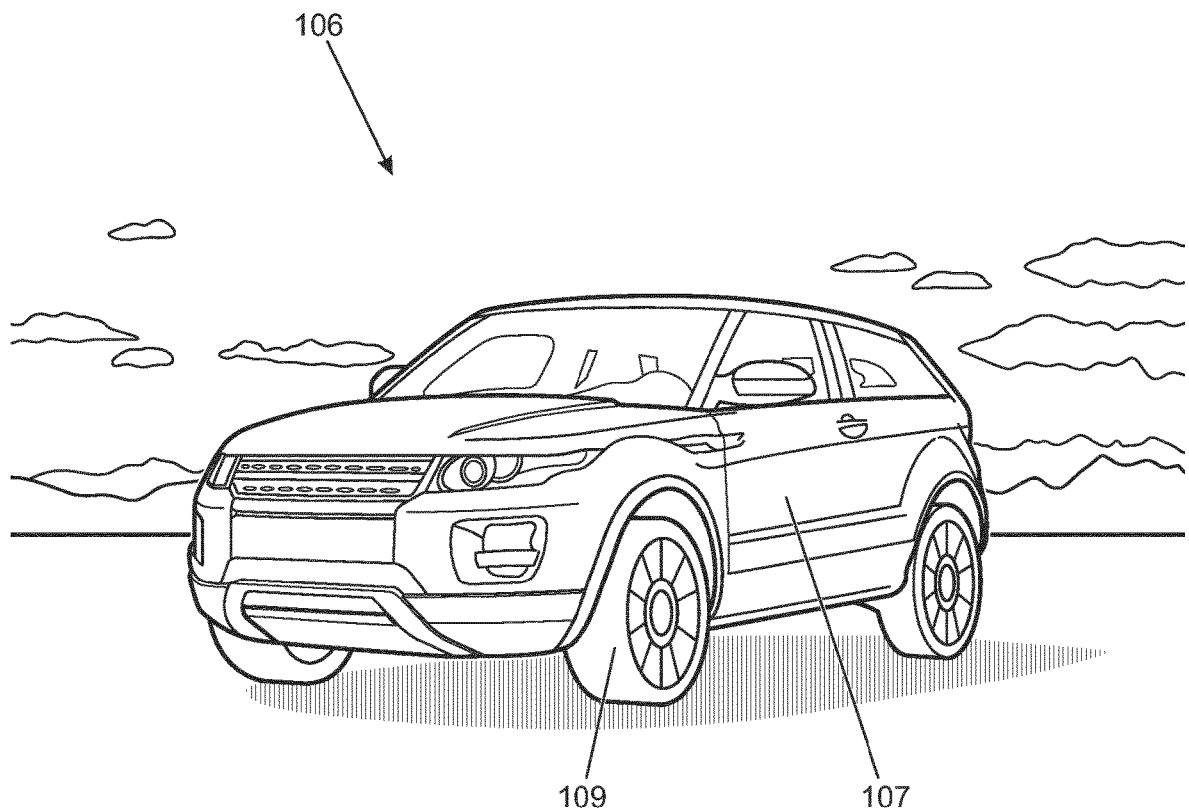
FIG. 2 shows a vehicle embodying a drive by wire system according to an embodiment of the present invention.

With reference to FIG. 2, a vehicle 106, such as a car, includes a body 107 and four wheels 109. The wheels 109 are powered by a drive system. The drive system is shown in further details in the form of a block diagram in FIG. 3.

Figure 3:
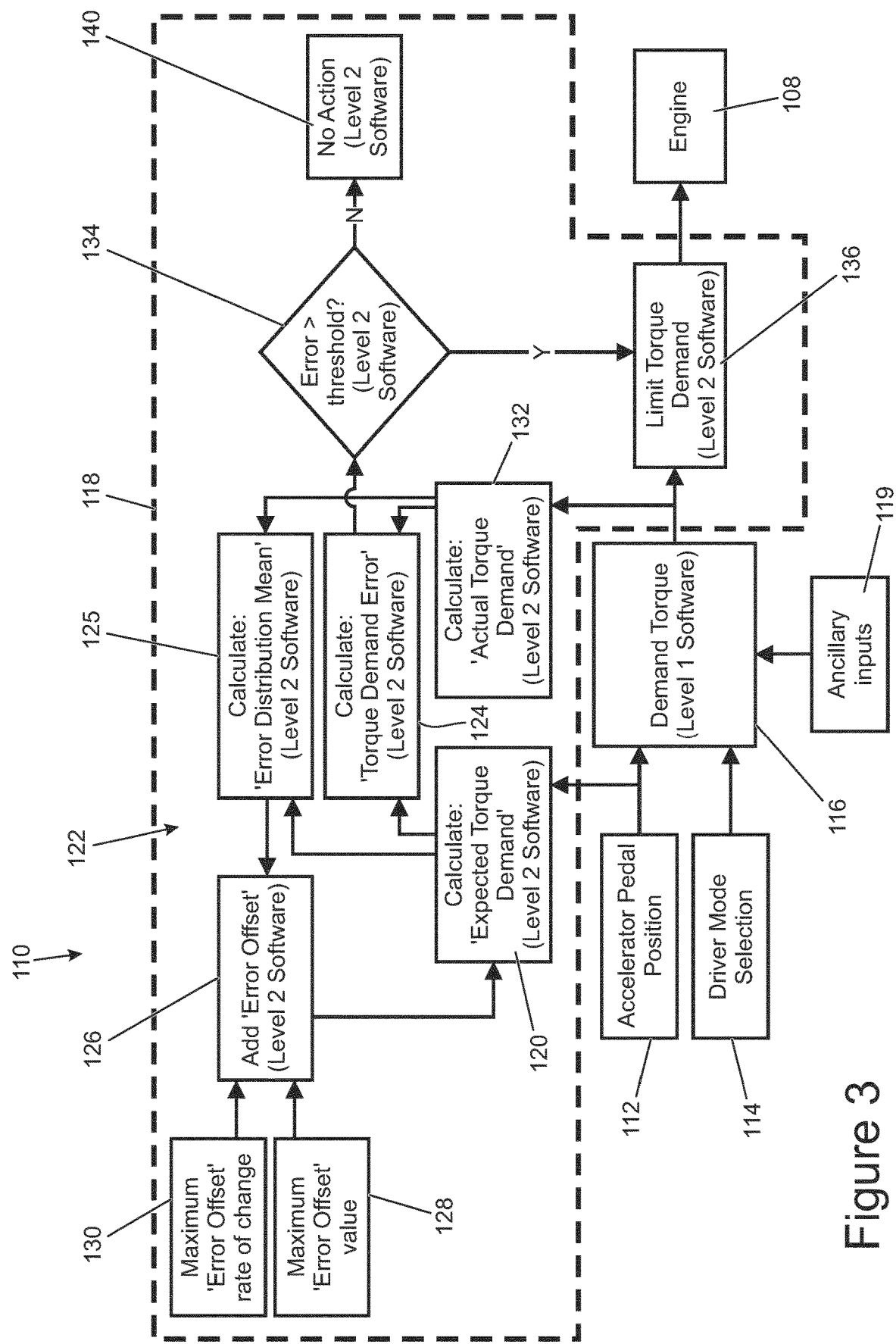
FIG. 3 is a block diagram schematically illustrating the components of a drive by wire system according to an embodiment of the present invention.

With reference to FIG. 3, the drive system, or drive-by-wire system 110 (terms to be used interchangeably), includes hardware in the form of an engine 108, an accelerator pedal, and a drive mode selector.

The accelerator pedal includes a base plate and a pedal part pivotably attached to the base plate. A position sensor using an induction sensor is fixed to the base plate and an activator key is fixed to the pedal. A metallic material, such as mild steel is used to make the activator key. When pivoting the pedal, the activator key is arranged to pass over the induction sensor without contact between the two. The induction sensor outputs a voltage depending on the position of the detected activator key. Ultimately, the position sensor outputs a digital signal.

The drive mode selector includes a lever inserted in a track. The lever is attached at one end beneath the track in a guiding channel. A position sensor, similar to that of the accelerator pedal, is provided for tracking the position of the lever. Different lever positions correspond to different driving modes. For instance, the driving modes include a 'sport' mode and an 'economy' mode. Other modes are possible too and there may be a plurality of driving modes, each associated with a unique lever position. Of course, alternative drive mode selectors are also possible such as a rotary selector for instance having multiple stable positions, each stable position being sensed and corresponding to a driving mode. Alternatively, a multiple button arrangement may be implemented.

The drive system 110 includes a computer (not shown) of the vehicle. The computer includes a processor and a memory unit, or data store. The memory unit is a non-volatile memory device for storing electronic data in the form of various control programmes. The processor is arranged to process the electronic data from the memory unit. Control programmes stored on the data store include programmes for a controller 116 and a verification module 118.

The controller 116 has a terminal for receiving inputs. In particular, the terminal is arranged to receive a first and a second primary inputs. In addition, the terminal is arranged to receive a plurality of ancillary inputs 119. The first input is an accelerator, or throttle, pedal position 112 and the second input is the drive mode selection 114. The ancillary inputs 119 include ambient air temperature, air pressure, surface gradient, and terrain type.

A plurality of transfer functions are provided as part of the controller 116 logic. Specifically, each drive mode is associated with a different transfer function. Each transfer function is arranged to convert the digital input from the accelerator pedal into a digital output. The output is termed a 'torque demand'. The torque demand is used by an engine control unit (ECU), or referenced more broadly as 'engine' in FIG. 3, for configuring the engine 108 to operate to output a particular engine torque. The ancillary inputs 119 are used by the controller 116 to modify the torque demand according to, for instance, the gradient on which the vehicle is currently travelling. In this way, the engine will not attempt to output an unrealistic or even damaging engine torque in circumstances where such an engine torque is not possible. This can be achieved by having a limiting value so as not to output a torque demand greater than a predetermined threshold or by providing an attenuation function to attenuate the output from the controller 116. Conversely, in other circumstances, there may be an amplification function or a minimum torque value threshold.

A broken line in FIG. 3 surrounds the verification module 118. The verification module 118 includes a calculation module 120, a correction module 122 formed from an error distribution calculator 125 and an error offset applicator 126, a value constrainer 128, a rate constrainer 130, an 'actual torque demand' calculator 132, a torque demand error 124, a comparator 134 and a limiter 136.

The calculation module 120 monitors the digital signal associated with the accelerator pedal position 112. In fact, the calculation module 120 monitors the accelerator pedal position 112 only and not the drive mode selection 114. An 'expected torque demand' is generated by the calculation module 120 for a given accelerator pedal position. In parallel, the calculator 132 calculates an 'actual torque demand' by interpreting the digital signal output from the controller 116 prior to the signal reaching the engine 108. The 'expected torque demand' aims to predict what the controller 116 has generated, albeit based on the accelerator pedal position 112 and so based only on a single transfer function. This is unlike the controller 116, which also uses the drive mode selection 114 to change between transfer functions prior to generating a torque demand based on the accelerator pedal position 112. Accordingly, the 'expected torque demand' will be less accurate since the choice of transfer function will likely impact on the torque demand generated by the controller 116.

In order to account for this difference in accuracy, the correction module 122 corrects the 'expected torque demand' by iteratively modifying subsequently calculated 'expected torque demands'.

Figure 4A:
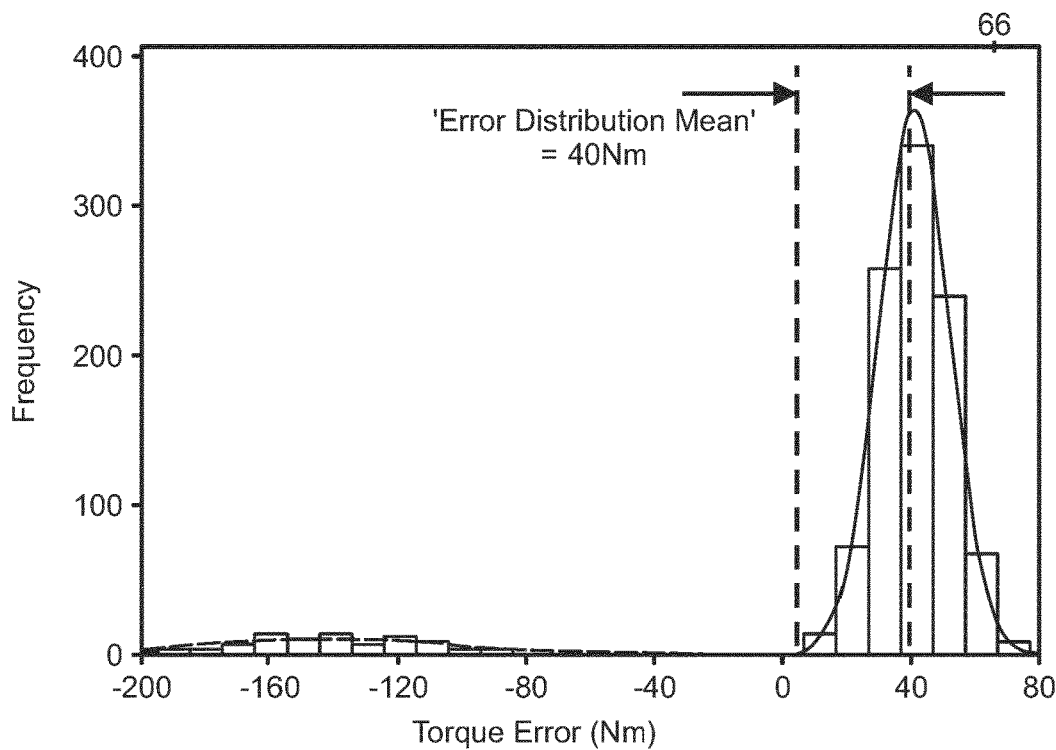
FIG. 4a is a graphical representation of a verification module comprised in FIG. 3 applying an offset to a sample mean error value.

With reference to FIG. 4a, the error distribution calculator 125 calculates an error between the 'actual torque demand' and the 'expected torque demand' by subtraction. In this way, an error is generated. An error is generated periodically with a sampling period in the order of around 0.2 seconds. Of course the sampling period may be extended or shortened according to a required sampling resolution. The number of occurrences, or frequency, of a particular error value (measured in terms of torque, Nm) is logged in the data store of the computer. A mean error value is calculated by the calculator 125. In the illustration shown in FIG. 4a, the error distribution mean is 40 Nm, with a range of error values being 80 Nm. The error distribution mean in FIG. 4a is a normal distribution curve though in principle any distribution type would be possible.

Figure 4B:
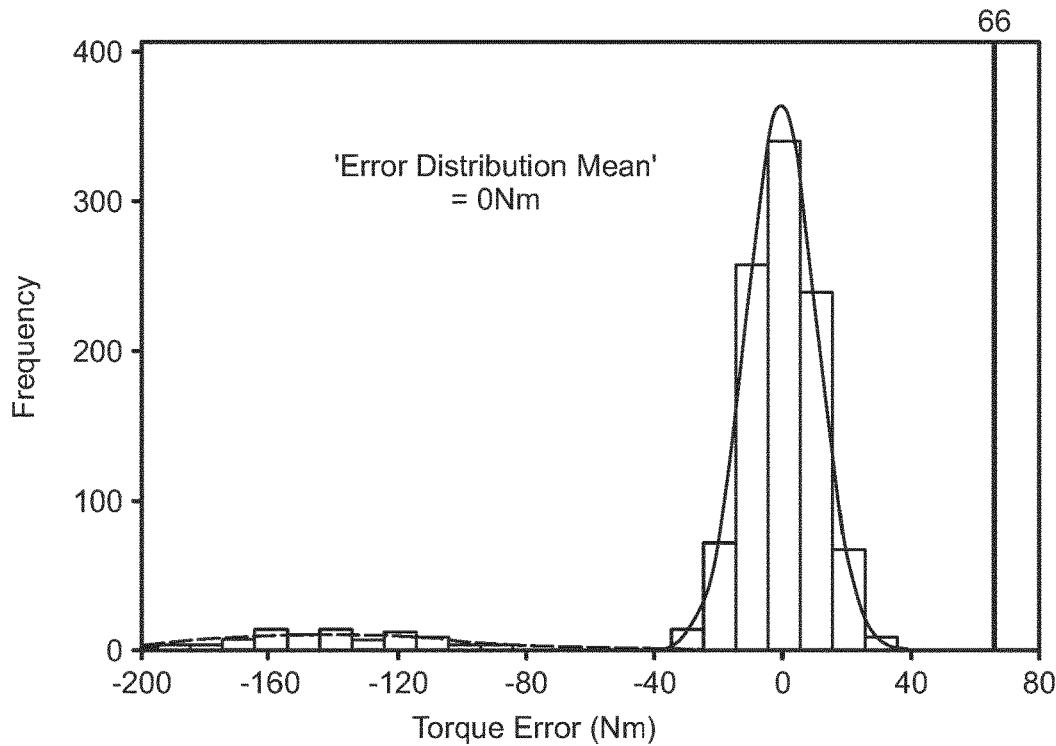
FIG. 4b is a graphical representation, similar to the representation of FIG. 4a, of a verification module applying an offset to a different sample mean error value.

With reference to FIG. 4b, the offset applicator 126 (FIG. 3) applies an offset to the mean error value. The offset is applied by subtracting an offset value to the mean error value in the event that the mean error value is positive. Conversely, the offset can be applied by adding an offset value to the mean error value in the event that the mean error value is negative. The offset applicator 126 applies the offset value periodically. An appropriate time period is around 5 seconds though again this period could be increased or decreased whenever appropriate.

With further reference to FIG. 3, the magnitude of the offset is constrained in two ways. Firstly, the offset is constrained by the value constrainer 128. For instance, a value constraint of 20 Nm applied to the offset applicator 126 would only permit reduction of a 40 Nm mean error distribution to 20 Nm. Similarly, the rate of change of error reduction is limited by the rate constrainer 130. For instance, a rate constraint of 10 Nm/s applied to the offset applicator 126 would allow 40 Nm reduction to 0 Nm since the sampling period is 5 seconds. A subsequently calculated 'expected torque demand' will thus be 40 Nm lower than it would ordinarily have been had the calculation module 120 calculated the 'expected torque demand' independently.

Next, the comparator 134 compares the torque demand error 124 to a threshold value. If the torque demand error 124 is less than the threshold, no action 140 is taken by the verification module 118. However, if the torque demand error 124 is greater than the threshold, the comparator outputs a command to limit the torque demand. In response to receiving the command, the limiter 136 limits the torque demand to a predefined threshold value. In this way, no unduly excessive vehicle acceleration would result from a malfunctioning controller 116. In addition, other actions could be taken such as illuminating a malfunction indicator lamp (not show) to advise a driver that the controller is not working satisfactorily.

The verification module described above is particularly simple and beneficial during a life of the controller since no updates to the verification module are required if the controller is updated to change its response to different driving modes. In addition, the design of the controller can be much simpler since no detailed knowledge of the different transfer functions is required. In addition, this approach is compatible with a controller that itself adapts or modifies a transfer function between the accelerator pedal and the torque demand as opposed to selecting a different transfer function. This may be the case when varying road gradients occur or where different road surfaces are detected, etc.

The verification module (118) could have applications in many fields including but not limited to the aeronautical, train or boat industries as there are many examples where verifying controller accuracy is regarded as being important.

As well as torque levels already discussed, in other embodiments the expected demand signal may include levels of movement in an aircraft wing system required to direct an aircraft path or the levels of aircraft engine thrust required to power the aircraft in flight.

In another embodiment the expected demand signal may relate to how deep a submarine is underwater and the verification module (118) could verify the depth as being potentially inaccurate avoiding unnecessary hull stress.

In another embodiment the throttle demand on a passenger train may need verification to ensure excessive acceleration is not experienced by passengers especially when cornering.

The skilled person will appreciate that the above are only examples and that there are many other examples of signal control verification which would benefit from this type of signal verification concept.

The invention claimed is:

1. A device for verifying accuracy of a torque demand, comprising:
   a controller that is configured to generate a torque demand based on a first input and a second input;
   a processor;
   a memory associated with the processor; and
   a verification module including:
      a calculation module configured to calculate an expected torque demand based on the first input, and not based on the second input;
      a correction module configured to calculate an error between the torque demand and the expected torque demand and to modify the expected torque demand to reduce the error; and
      a limiter configured to limit the torque demand in response to the error being greater than a threshold.

2. The device of claim 1, wherein the correction module is configured to reduce the error by applying an offset value to the expected torque demand.

3. The device of claim 2, comprising a value constrainer for constraining the offset value to a maximum value.

4. The device of claim 2, comprising a rate constrainer for constraining the offset value to a maximum rate of change.

5. The device of claim 2, wherein the correction module is arranged to determine a mean error based on a plurality of calculated errors and apply the offset to the mean error.

6. The device of claim 1, wherein
   the controller is a drive-by-wire controller that is at least a portion of the processor; and
   the controller includes a terminal configured to receive the first input and the second input.

7. The device of claim 6, wherein the first input is an accelerator pedal position.

8. The device of claim 7, wherein the second input is a drive mode selection for selecting between a plurality of driving modes.

9. The device of claim 6, wherein the torque demand is an engine output torque demand.

10. The device of claim 6, wherein
    the terminal is configured to receive one or more ancillary inputs; and
    the ancillary inputs are selected from a list including ambient air temperature, air pressure, surface gradient, and terrain type.

11. A drive-by-wire system for a vehicle comprising:
    an accelerator pedal,
    a drive mode selector,
    an engine, and
    the device of claim 8, wherein the controller is configured to generate the torque demand based on the accelerator pedal position and the drive mode selection.

12. A vehicle comprising the drive-by-wire system of claim 11.

13. A method of verifying an accuracy of a controller, the method comprising:
    generating a torque demand based on a first input and a second input received by the controller;
    determining an expected torque demand based on the first input, and not based on the second input to the controller;
    determining an error between the expected torque demand and the torque demand generated by the controller;
    modifying the expected torque demand to reduce the error; and
    limiting the torque demand in response to the error being greater than a threshold.

* * * * *